Patented Mar. 20, 1951

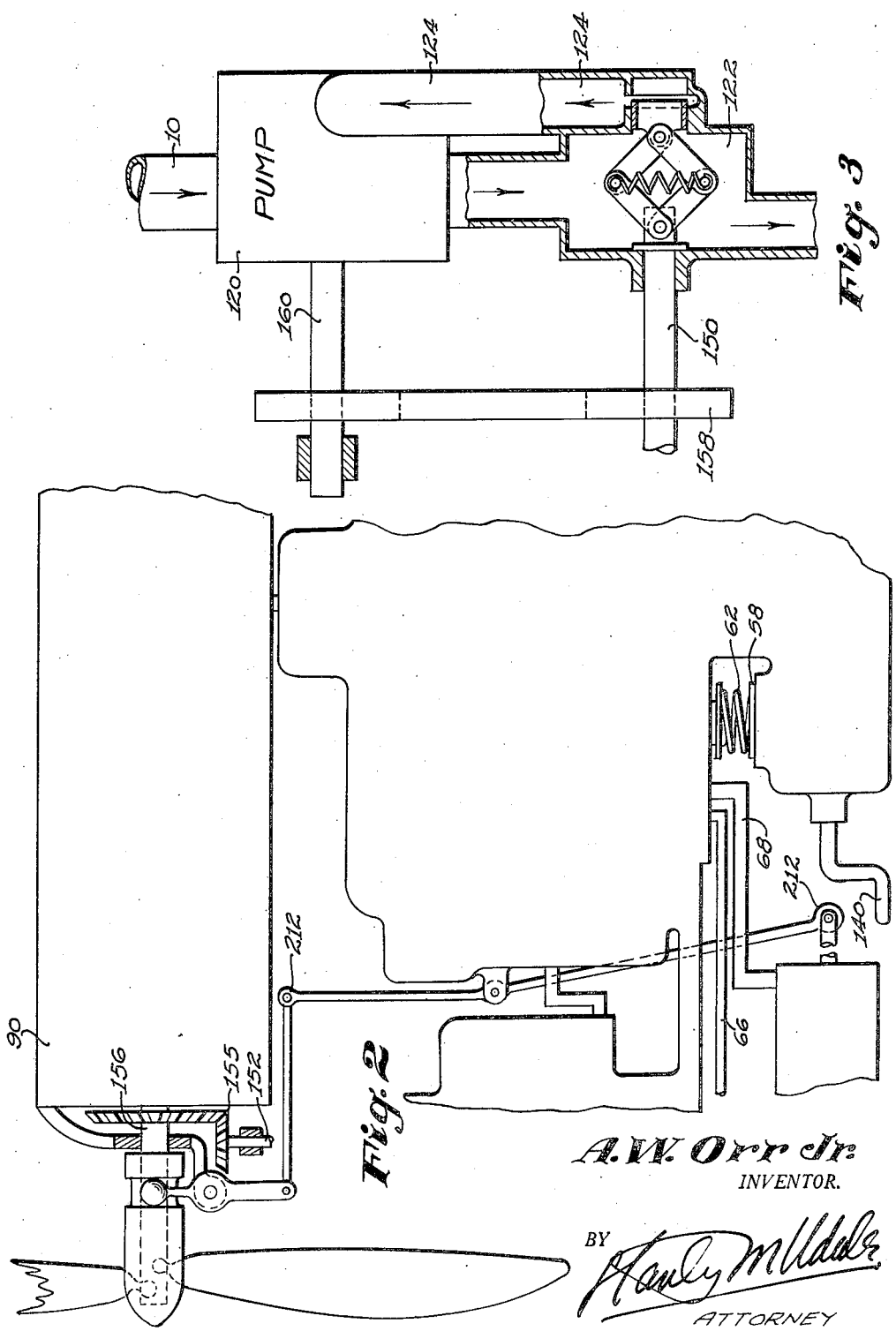

2,545,703

UNITED STATES PATENT OFFICE 2,545,703

GAS TURBINE TEMPERATURE CONTROL RESPONSIVE TO AIR AND FUEL FLOW, COMPRESSOR INTAKE AND DISCHARGE TEMPERATURE AND SPEED

Andrew William Orr, Jr., Detroit, Mich., assignor to George M. Holley and Earl Holley Application March 17, 1947, Serial No. 735,272

11 Claims. (Cl. 60—41)

1

The object of this invention is to regulate the temperature of the burnt products of combustion in a gas turbine.

Specifically the object is to prevent the temperature from exceeding the critical maximum temperature.

Fig. 2 shows a propeller on the end of the shaft of the gas turbine. Fig. 3 shows details of the governor control.

Figure 1:
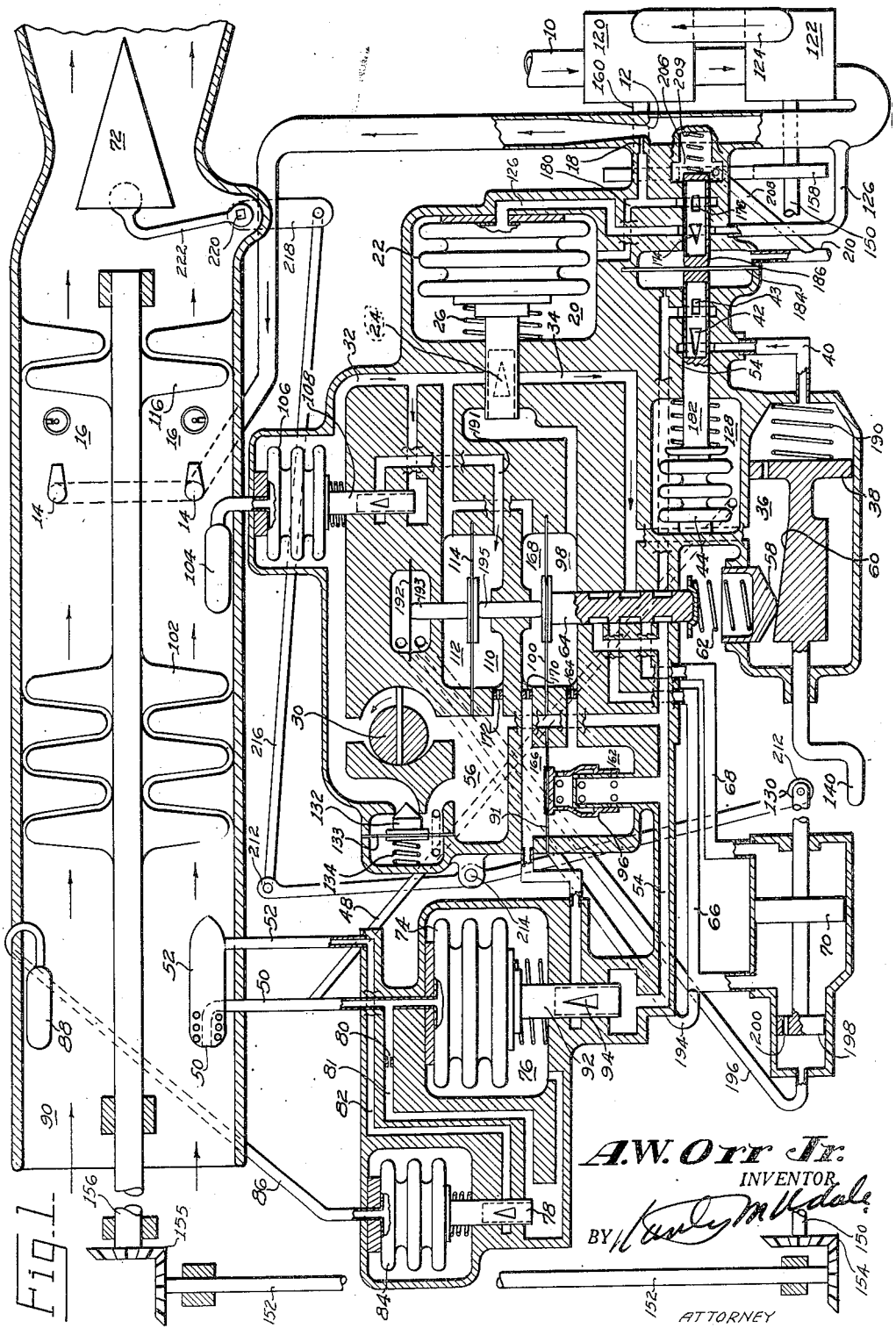
Fig. 1 shows diagrammatically the preferred form of my invention.

In the drawing, fuel enters at 10, flows through the engine driven fuel pump 120, through a speed governor 122 which is also driven by the engine through a shaft 150, which is driven by a shaft 152 and by bevel gears 154. The shaft 152 is driven by the bevel gears 155 and these bevel gears 155 are driven by the shaft 156, which is the main shaft of the gas turbine. The fuel pump 120 is driven from the shaft 150 by the belt and pulley 158 which drives the pump shaft 160. The fuel rejected by the governor 122 is returned to the pump 120 through the return passage 124. The fuel delivered from the governor 122 flows through the venturi 12 to the burners 14 in the combustion chamber 16.

A restriction 18 connects the throat of the venturi to the outside chamber 20 surrounding the bellows 22. The inside of bellows 22 is connected to the fuel entrance leading to the venturi 12 through the passage 126. The bellows 22 controls the position of the valve 24. The fuel flow recording valve 24 admits regulating fluid to chamber 98.

A regulating fluid pump 30 also driven by the engine, pushes oil under pressure along the passage 32, past the valve 24 to the passage 34, to the chamber 36 through a restricted opening in the piston 38, along the passage 40, past the selector cam correction valve 42. The piston 38 is pushed to the left by the spring 190.

The air pressure correction bellows 44 is evacuated and the outside chamber 128, surrounding bellows 44, is connected through the pipe 48 to the impact tube 50 of the Pitot tube combination 50—52.

The oil flows past the selector cam correction valve 42 and the port 43 to the passage 54 which flows to the low pressure tank 56 which supplies oil pump 30 with its regulating fluid. Hence,

2 when the altitude increases then the valve 42 moves to the right and the flow along passage 40 decreases, the piston 38 moves to the left under the influence of the spring 190, and the element 58, riding on the cam 60, falls and relieves the pressure on the spring 62.

Servomotor valve 64 falls and admits oil under pressure to the pipe 68 from the passage 34. Pipe 66 is at the same time connected to the low pressure oil tank 56 through the pipe 54. The piston 70 thereupon travels to the left to decrease the pitch of the propeller or to decrease the temperature by moving the tail cone to the left. This is accomplished by connecting the piston rod 130 to the lever 212 mounted on the pivot 214. The lever 212 is connected through the link 216 to the lever 218. The lever 218 is connected to the shaft 220 on which is mounted the lever 222 which controls the position of the cone 72. An increase in airflow automatically causes a decrease in temperature.

Meanwhile, the airflow responsive means are functioning. These means are bellows 74, the inside of which is connected to the impact tube 50. The outside chamber 76 is connected to the Pitot static tube 52, through the valve 78 which is the air temperature correction valve, and through the passage 82.

A restriction 80 is located in a return passage 81 which renders the valve 78 effective to control the pressure in chamber 76 with the temperature. The valve 78 is connected to the bellows 84 and is connected through the pipe 86 to the temperature responsive bulb 88 located in the air entrance 90.

At high temperature the valve 78 closes so that the Pitot tube combination 50—52 is less effective.

As air flow is increased the rod 92 descends and closes the airflow recording valve 94. The result of the descent of the valve 94 is to cause the pressure in the chamber 166 to increase. The pressure in chamber 166 balances the pressure in chamber 162. The diaphragm 91, between the chamber 162 and the chamber 166, carries the constant differential valve 96. This valve 96 therefore causes the pressure in chamber 98 to increase. The pressure in chamber 98 is the pressure downstream from the valve 24. The pressure in the chamber 168, above the diaphragm 100, is the constant pressure created by the pump 30. Hence, an increase in airflow causes the servomotor valve 64 to rise. The result of this is that the cone 72 moves to the right or the propeller pitch is increased as the case may be. The chamber 98, below the diaphragm 100, is connected to the chamber 162, below the diaphragm 91, through the restriction 164. The chamber 168, above the diaphragm 100, is connected with the chamber 166, above the diaphragm 91, through the restriction 170. The restrictions 170—164 render the movement of the constant differential valve effective to accomplish this desired result, that is to balance air flow against fuel flow.

The fuel flow recording valve 24, when it moves to the left in response to increased fuel flow decreases the oil flow and causes the pressure in chamber 98 to fall as valve 24 cuts off the admission of high pressure oil from the passage 32, to the chamber 98.

Hence, an increase in air flow causes the pressure in chamber 98 to increase and the pressure in chamber 98 to decrease with an increase in fuel flow. The diaphragm 100 thus responds to the relative excess of air over fuel flow or excess of fuel over air flow as the case may be.

The temperature of the air delivered by the compressor 102 to the combustion chamber 16 is measured by the bulb 104. The bulb 104 controls the expansion and contraction of the bellows 106. Bellows 106 controls the valve 108. Valve 108, when the element 104 is cold, is wide open and the pressure in passage 32 is transmitted past the valve 108 to the chamber 110, practically undiminished, through the passage 191. The chamber 56 communicates with the chamber 110 through the restriction 172. Chamber 112, above the diaphragm 114, is in free communication at all times with the pressure in the passage 32 on the high pressure side of the pump 30 so that at low temperature the diaphragm 114 has little function. It functions at high temperature to assist the diaphragm 100, as the temperature of the gases entering the gas turbine 116 is the sum of the temperature recorded by element 104 plus the temperature rise due to the fuel/air ratio of the mixture which burns in the combustion chamber 16.

To limit the pressure that can be generated by the pump 30 the pressure relief valve 132 is provided. Valve 132 is loaded by a spring 134 and is carried by diaphragm 133.

Cam surface 60 is contoured. The lever 140 permits the surface 60 to be rotated about the axis of the piston 38 to present a new surface to the cam follower 58.

The altitude bellows 44 engages with a rod 182 which carries the valve 42. The end of the rod 182 engages with the diaphragm 184. A rod 186 engages with the other side of the diaphragm 184. The rod 186 is hollow and carries the valve 174, which valve communicates through a port 176 with the passage 180 which is in communication with the restricted passage 18, in the throat of the venturi 12, and also communicates with the chamber 20 surrounding the bellows 22.

The diaphragm 192, located above the rod 193, which rod 193 engages with the rod 195 which engages with the top of the servomotor valve 64. The pressure in the pipe 66 is transmitted to the upper surface of the diaphragm 192 through the pipe 194. Pipe 196 transmits the pressure to the underside of the diaphragm 192. The pressure transmitted through the pipe 196 is derived from the left hand side of piston 198 which is carried by the left hand end of the piston rod 139. A restriction 200, in the piston 198, has the effect of checking the motion of the servomotor valve 64 and thus prevents "hunting."

The chamber forming the left hand side of diaphragm 184 is connected with the passage 54 through a restriction. The chamber forming the right hand side of the diaphragm 184 is a drain passage 210 which drains to the atmosphere. The chamber 208, at the extreme right of the rod 186, contains a spring 209 which pushes the rod 108 against the diaphragm 184. The chamber 208 is connected to the drain passage 210 through a passage 206.

For a given position of the manually operated lever 140 it is possible with valve 42 to vary the temperature automatically, without moving the lever 140, as the altitude increases. At very high altitude valve 42 closes and this detail thereupon becomes inoperative above a certain ceiling. The action at low altitudes, near sea level, is to lower maximum temperatures.

The valve 174 maintains the desired fuel/air ratio despite the drop in density of the air at altitudes, which otherwise would result in a richer mixture.

OPERATION

Let us assume that the device is in operation and that the lever 140 has been moved to give a desired temperature in the combustion chamber. The cam follower 58 then rides on the cam 60 and positions the servomotor valve 64, by reason of the spring 62, balancing the pressures acting down on the diaphragm 100 plus the pressure acting down on the diaphragm 114. The pressure acting on the diaphragm 114 is a pressure which is controlled by the temperature downstream from the compressor 102, that is to say, the pressure controlled by the compressor temperature control valve 108. This temperature heats the bulb 104. Heat on the bulb 104 expands the bellows 106. Expansion of the bellows 106 causes the valve 108 to descend. The descent of the valve 108 restricts the flow of oil under pressure down the pasage 32, up through the center of the valve 108, down the passage 191 into the chamber 110 and then through the restriction 172 into the low pressure oil chamber 56, so that an increase in temperature causes an increased pressure differential to act on the diaphragm 114. An increased pressure differential acting on the diaphragm 114 causes the servomotor valve 64 to descend. This causes the high pressure oil in passage 32 and 34 to act on the right hand side of the piston 70, through the pipe 68 causing the link 130 to move to the left which causes the cone 72 to open, that is to move to the left, which permits an increased air flow and thereby reduces the temperature. A similar result is obtained by decreasing the pitch of the propeller driven by the shaft 156. An increase in the pressure differential acting on the diaphragm 100 has the same effect as an increase in pressure differential acting on the diaphragm 114. The pressure differential acting on the diaphragm 100 is controlled by the fuel flow acting through the valve 24 and to the air flow acting through the valve 94. An increase in fuel flow causes the valve 24 to move to the left and it decreases the pressure below the diaphragm 100. An increase in air flow causes the valve 96 to descend which increases the pressure in chamber 162. An increase in pressure in chamber 162 decreases the flow through restriction 164. Thus, pressure in chamber 98 rises, hence, servomotor valve 64 rises and the cone 72 moves to the right.

Valve 78 is the temperature correcting valve and corrects for the temperature in the air entrance 90 as recorded in the bulb 88 through the pipe 86 and bellows 84.

Whenever the piston 70 moves to the right or left the diaphragm 182 checks the movement of the servomotor valve 64 and "hunting" is thereby avoided.

The drawing shows a construction in which, when the fuel flow is excessive, the cone 72 moved to the left when the piston 70 is moved to the left. Alternatively the pitch of a propeller, mounted on the shaft 156, should be decreased when the piston 70 is moved to the left. In either case the ratio of fuel to air is restored to that ratio of fuel to air which will give the desired rise in temperature in the combustion chamber 16.

If the position of the cone 72 is fixed or if the pitch of the propeller is fixed then the movement of the piston 70, to the left, must be arranged to throttle the flow of fuel through the fuel venturi 12.

When the second alternative is used, that is, when the position of the cone 72 is fixed or a fixed propeller is used on the shaft 156 and the temperature rise is controlled directly by throttling the fuel flow through the venturi 12, then the governor 122 has normally no function and can be set so that it will only act at excessive speeds.

What I claim is:

1. A combustion chamber temperature control device for a gas turbine having a turbine driven air compressor, a speed governor driven by said gas turbine adapted to regulate the speed of said turbine by reducing the fuel supply comprising, temperature responsive means responsive to the temperature of the air entering the combustion chamber, means responsive to both the fuel and air flows acting in opposition to each other to produce a force, said force acting in conjunction with the force derived from said temperature responsive means to produce a resultant force, a servomotor valve, yieldable means engaging with said servomotor valve acting in opposition to said resultant force, an increase in temperature of the entering air having the same effect as an increase in fuel flow relative to air flow to increase said resultant force, a motor, a supply of fluid under pressure adapted to operate said motor, said servomotor valve being connected to said pressure fluid so as to control said motor, means to vary the air flow through said gas turbine, linkage connecting said air flow control means with said motor whereby the air supply is increased with an increase of temperature of the air entering the combustion chamber and also by an increase in the fuel flow relative to the air flow.

2. A device as set forth in claim 1 in which there are additional temperature responsive means responsive to the temperature of the air entering said air compressor, said means being associated with the air flow responsive means to render the air flow responsive means less effective to oppose the fuel flow responsive means when the air entering the compressor is hot.

3. A combustion chamber temperature control device for a gas turbine having a speed governor driven by said gas turbine adapted to regulate the speed of said turbine by reducing the fuel supply, an air compressor driven by said gas turbine, an air entrance to the compressor, air flow indicating means in said air entrance, air temperature correction means therefor, a combustion chamber, an air entrance thereto forming the air exit from said compressor, air temperature responsive means in said exit, a burner in said combustion chamber, a fuel supply therefor, a fuel passage leading to said burners from said supply, a restriction in said passage, load control means for said gas turbine, automatic control means connected to said load control means comprising a hydraulic motor, a source of hydraulic fluid under pressure for said motor, a servomotor valve for said fluid controlling said motor, yieldable means for moving said servomotor valve in the direction to call for more load, means responsive to the drop in pressure at said fuel restriction to oppose said movement, means responsive to an increase in temperature of the air in said compression exit to also oppose said movement, means responsive to an increase in pressure difference at said air indicating means to assist said movement whereby an increase in fuel flow, a decrease in the air flow and an increase in temperature of the air in the compressor exit jointly act to reduce the load and thereby increase the turbine speed above the governed speed and to thus reduce the fuel flow and hence the combustion chamber temperature.

4. A device as set forth in claim 3 in which there is a barometric means adapted to vary said yieldable means so as to correct for the pressure drop at altitude.

5. A combustion chamber temperature control device for a gas turbine having a speed governor driven by said gas turbine adapted to limit the speed of said gas turbine by reducing the fuel supply, an air compressor driven by said gas turbine adapted to supply said combustion chamber with compressed air, an air entrance to said compressor, air flow indicating means in said air entrance therefor, an air exit from said compressor, air temperature responsive means in said air exit chamber, a burner in said combustion chamber, a fuel supply therefor, a fuel passage leading to said burner from said fuel supply, a restriction in said fuel passage, load control means for said gas turbine, automatic control means therefor comprising a source of hydraulic fluid under constant pressure, an hydraulic motor, a servomotor valve for said motor, manually variable yieldable means for moving said servomotor valve so as to vary the load in said gas turbine, hydraulic means to oppose said yieldable means so as to position said servomotor valve, said hydraulic means being responsive to the drop in pressure at said fuel restriction acting in opposition to the pressure difference at said air flow indicating means and to the temperature responsive means located in the exit from said air compressor whereby the temperature rise in the combustion chamber is controlled by the variable yieldable means and the temperature in the exit from said air compressor.

6. A fuel control mechanism for an external combustion engine including a gas turbine, a turbine driven air compressor supply compressed air to a combustion chamber, an air conduit leading to said air compressor, first control means responsive to variations in the quantity of air flowing through said conduit and to the changes in temperature of the air flowing into said conduit, a fuel nozzle discharging into said combustion chamber, a fuel supply pump, a fuel supply passage leading to said nozzle, a restriction in said fuel supply passage, a second control means responsive to the drop in pressure at said fuel restriction, a speed governor for said gas turbine driven by said gas turbine, a fuel return passage connected upstream above said fuel restriction and to the suction side of said fuel pump, said governor being adapted to control the flow through said return fuel passage so as to limit the maximum speed of said gas turbine by limiting the fuel flow, load control means for said gas turbine, a source of hydraulic fluid under pressure, hydraulic control mechanism operated thereby including a motor and a servomotor valve therefor, yieldable means for moving said servomotor valve so as to increase the load, said second mentioned control means acting to oppose both said first mentioned control means and said yieldable means, acting jointly, whereby an increase in fuel flow relative to air flow reduces the load and thus increases the speed which causes the governor to reduce the fuel flow.

7. A device as set forth in claim 6 in which there is a third control means responsive to the temperature of the compressed air leading said air compressor, said third control means acting jointly with said second control means to oppose said first control means.

8. A device as set forth in claim 6 in which there is an additional control means responsive to the pressure of the air entering the air compressor, said additional means acting so that a fall in pressure reduces the yieldable means and the load.

9. A device as set forth in claim 6 in which there are additional control means responsive to the pressure of the air entering the air compressor and to the temperature of the air compressor air leaving said air compressor, both of said means acting to reduce the load as the temperature rises and the pressure falls.

10. A device as set forth in claim 6 in which there is an additional control means responsive to the pressure of the air entering the air compressor adapted to both vary the yieldable means controlling the position of the servomotor valve and to vary the effect of the drop in fuel pressure at said fuel restriction so that the fuel/air ratio is corrected for a drop in air pressure of the atmosphere and the yieldable means is reduced and the gas turbine load is reduced as the pressure of the atmosphere drops.

11. A fuel control mechanism for an external combustion engine including a gas turbine, a turbine driven air compressor supplying compressed air to a combustion chamber, an air conduit leading to said air compressor, a first control means responsive to variation in the quantity of air flowing through said conduit, a second control means responsive to the temperature of the compressed air entering the combustion chamber, a fuel nozzle discharging into said combustion chamber, a fuel supply pump, a fuel supply passage leading to said nozzle, a restriction in said fuel supply passage, a third control means responsive to the drop in pressure in said fuel restriction, automatic means for controlling the fuel/air ratio, comprising a source of hydraulic fluid under pressure, hydraulic control mechanism operated thereby including a motor and a servomotor valve therefor, manually selected means for moving said servomotor valve so as to decrease the fuel supply, said second and third mentioned control means acting jointly to oppose both said first mentioned control and said yieldable means, acting jointly, whereby an increase in the fuel/air ratio is automatically reduced whenever the sum of the temperature of the air entering the combustion chamber plus a function of the fuel/air ratio exceeds the value of the selected yieldable means.

ANDREW WILLIAM ORR, JR.

REFERENCES CITED

The following references are of record in the file of this patent:

UNITED STATES PATENTS

| Number | Name | Date |
|---|---|---|
| 2,011,420 | Samuelson | Aug. 13, 1935 |
| 2,378,036 | Reggio | June 12, 1945 |
| 2,384,282 | Chandler | Sept. 4, 1945 |
| 2,405,888 | Holley | Aug. 13, 1946 |